(12) United States Patent
Bonnefoi et al.

(10) Patent No.: US 10,760,583 B2
(45) Date of Patent: Sep. 1, 2020

(54) AXIAL BEARING ARRANGEMENT FOR A DRIVE SHAFT OF A CENTRIFUGAL COMPRESSOR

(71) Applicant: Danfoss Silicon Power GmbH, Flensburg (DE)

(72) Inventors: Patrice Bonnefoi, Nordborg (DK); Yves Rosson, Nordborg (DK)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 16/329,313

(22) PCT Filed: Aug. 31, 2017

(86) PCT No.: PCT/EP2017/071874
§ 371 (c)(1),
(2) Date: Feb. 28, 2019

(87) PCT Pub. No.: WO2018/041949
PCT Pub. Date: Mar. 8, 2018

(65) Prior Publication Data
US 2019/0226489 A1 Jul. 25, 2019

(30) Foreign Application Priority Data

Sep. 2, 2016 (FR) ..................................... 16 58168

(51) Int. Cl.
*F04D 29/051* (2006.01)
*F16C 32/06* (2006.01)
(Continued)

(52) U.S. Cl.
CPC ......... *F04D 29/0513* (2013.01); *F04D 17/10* (2013.01); *F04D 29/057* (2013.01);
(Continued)

(58) Field of Classification Search
CPC ........ F16C 17/04; F16C 27/02; F16C 27/063; F16C 39/04; F16C 32/0614;
(Continued)

(56) References Cited

U.S. PATENT DOCUMENTS 4,465,446 A   8/1984  Nemit, Jr. et al.
4,828,403 A * 5/1989  Schwartzman ......... F16C 17/10
                                              384/100

(Continued)

FOREIGN PATENT DOCUMENTS

EP        1770811 A2    4/2007
JP     2017089384 A *   5/2017  ........... F04D 29/057
(Continued)

OTHER PUBLICATIONS

International Search Report for Serial No. PCT/EP2017/071874 dated Jun. 11, 2017.

*Primary Examiner* — Marcus Charles
(74) *Attorney, Agent, or Firm* — McCormick, Paulding & Huber PLLC

(57) ABSTRACT

The axial bearing arrangement comprises a first axial bearing plate (12) and a second axial bearing plate (13) each having an annular ring shape, the first axial bearing plate (12) having a first surface (12.1) axially facing the second axial bearing plate (13) and a second surface (12.2) opposite to the respective first surface (12.1), the second axial bearing plate (13) having a first surface (13.1) axially facing the first axial bearing plate (12) and a second surface (13.2) opposite to the respective first surface (13.1); a spacer ring (14) clamped between the first surfaces (12.1, 13.1) of the first and second axial bearing plates (12, 13), the spacer ring (14) defining an axial distance between the first and second axial bearing plates (12, 13); and a bearing sleeve (15) abutting the second surface (13.2) of the second axial bearing plate (13) and being secured to a compressor block (16). The axial (Continued)

bearing arrangement includes an elastic element (22) axially biasing the first and second axial bearing plates (12, 13) and the spacer ring (14) with a predetermined force against an abutment surface (17) of the bearing sleeve (15).

20 Claims, 3 Drawing Sheets

(51) Int. Cl.
| | |
|---|---|
| *F04D 29/057* | (2006.01) |
| *F04D 29/059* | (2006.01) |
| *F01D 17/10* | (2006.01) |
| *F04D 17/10* | (2006.01) |
| *F16C 27/02* | (2006.01) |
| *F16C 17/04* | (2006.01) |

(52) U.S. Cl.
CPC ............ *F04D 29/059* (2013.01); *F16C 17/04* (2013.01); *F16C 27/02* (2013.01); *F16C 32/0614* (2013.01); *F16C 32/0674* (2013.01); *F16C 32/0692* (2013.01); *F16C 32/0685* (2013.01); *F16C 2360/44* (2013.01)

(58) Field of Classification Search
CPC .............. F16C 32/0674; F16C 32/0685; F16C 32/0692; F16C 2360/44; F04D 29/0513; F04D 29/057; F04D 29/059; F04D 29/0674
USPC ... 384/95, 99, 105, 109, 121, 129, 275–276, 384/420; 417/269; 91/71
See application file for complete search history.

(56) References Cited

U.S. PATENT DOCUMENTS

| | | | |
|---|---|---|---|
| 4,892,469 A | | 1/1990 | McCullough et al. |
| 5,246,352 A | * | 9/1993 | Kawakami ............ F01D 25/164 384/901 |
| 5,528,976 A | * | 6/1996 | Ikeda ................... F04B 27/1063 92/71 |
| 5,644,970 A | | 7/1997 | Michiyuki et al. |
| 5,813,314 A | * | 9/1998 | Michiyuki .......... F04B 27/1063 92/71 |
| 8,721,304 B2 | * | 5/2014 | Inagaki ............... F04B 39/0027 384/611 |
| 2008/0181546 A1 | | 7/2008 | Simon et al. |
| 2011/0243485 A1 | * | 10/2011 | Kume ................... F16C 17/024 384/106 |
| 2011/0243762 A1 | * | 10/2011 | Daikoku ............... F04D 29/584 417/321 |
| 2016/0097395 A1 | * | 4/2016 | Pruitt .................... F04D 29/662 417/407 |
| 2016/0146248 A1 | | 5/2016 | Ertas et al. |

FOREIGN PATENT DOCUMENTS

| | | |
|---|---|---|
| WO | 2010142633 A1 | 12/2010 |
| WO | 2013142461 A1 | 9/2013 |
| WO | 2014038080 A1 | 3/2014 |

\* cited by examiner

1

AXIAL BEARING ARRANGEMENT FOR A DRIVE SHAFT OF A CENTRIFUGAL COMPRESSOR

CROSS-REFERENCE TO RELATED APPLICATIONS

This application is a National Stage application of International Patent Application No. PCT/EP2017/071874, filed on Aug. 31, 2017, which claims priority to French Patent Application No. 1658168, filed on Sep. 2, 2016, each of which is hereby incorporated by reference in its entirety.

TECHNICAL FIELD

The present invention relates to an axial bearing arrangement for a drive shaft of a centrifugal compressor.

BACKGROUND

As known, an axial bearing arrangement for a drive shaft of a centrifugal compressor may include:
- a first axial bearing plate and a second axial bearing plate, also named first and second thrust plates, being parallel and each having an annular ring shape, the first axial bearing plate having a first surface axially facing the second axial bearing plate and a second surface opposite to the first surface of the first axial bearing plate, the second axial bearing plate having a first surface axially facing the first axial bearing plate and a second surface opposite to the first surface of the second axial bearing plate,
- a spacer ring clamped between the first surfaces of the first and second axial bearing plates at radial outer portions of the first and second axial bearing plates, the spacer ring defining an axial distance between the first and second axial bearing plates, and
- a bearing sleeve being secured to a compressor block and abutting the second surface of the second axial bearing plate, so as to tighten the first and second axial bearing plates and the spacer ring against a contact surface provided on the compressor block.

In operation, a radial flange portion of the drive shaft extends into a space defined between inner surface of the spacer ring and radial inner portions of the first surfaces of the first and second axial bearing plates, and cooperates with the first surfaces of the first and second axial bearing plates in order to limit an axial movement of the drive shaft.

In such a compressor, especially when operating at very high speed, high temperature conditions may occur, inducing thermal stress and deformations in compressor components, e.g. when components of different thermal expansion materials are secured to each other and/or when there is large thermal gradient in solid parts.

Especially critical is the axial bearing arrangements, where the radial flange portion of the drive shaft rotates between the first and second axial bearing plates, with very small clearances between rotating and fixed parts.

Mechanical stress introduced into the axial bearing arrangement through tolerances in mounting and assembling of the compressor or due to above-mentioned non-uniform thermal expansion may deteriorate the parallel positioning of the first and second axial bearing plates. This can lead to seizure of the axial bearing arrangement and shortened lifetime of the centrifugal compressor.

SUMMARY

It is an object of the present invention to provide an improved axial bearing arrangement which can overcome the drawbacks encountered in conventional axial bearing arrangements.

Another object of the present invention is to provide an axial bearing arrangement which is reliable, and which is particularly not subjected to the above-mentioned deformations.

According to the invention such an axial bearing arrangement includes:
- a first axial bearing plate having an annular ring shape, the first axial bearing plate having a first surface and a second surface opposite to the respective first surface,
- a spacer ring abutting the first surface of the first axial bearing plate at a radial outer portion of the first axial bearing plate,
- a bearing sleeve being secured to a compressor block, characterized in that the axial bearing arrangement further includes an elastic element arranged between the second surface of the first axial bearing plate and the compressor block, and in that the elastic element axially biases the first axial bearing plate and the spacer ring with a predetermined force against an abutment surface of the bearing sleeve.

Such a configuration of the axial bearing arrangement, and particularly the presence of the elastic element, allows, when a thermal expansion occurs, an axial sliding of the first bearing plate and of the spacer ring with respect to the compressor block, and thus avoids deformations of the parts which could lead to a seizure of the parts and a shortened lifetime of the centrifugal compressor.

The axial bearing arrangement may also include one or more of the following features, taken alone or in combination.

According to an embodiment of the invention, the abutment surface of the bearing sleeve extends transversally, and for example substantially perpendicularly, to a longitudinal axis of the bearing sleeve.

According to an embodiment of the invention, the abutment surface is located at an axial end of the bearing sleeve.

According to an embodiment of the invention, the elastic element is an annular spring washer, preferably of the Belleville type.

According to an embodiment of the invention, the predetermined force exerted by the elastic element on the first axial bearing plate is in the range of 1000 to 2000 N, preferably about 1500 N.

According to an embodiment of the invention, the elastic element is in contact with a radial outer portion of the second surface of the first axial bearing plate.

According to an embodiment of the invention, the elastic element is in contact with a radial outer portion of the second surface of the first axial bearing plate, at a radius close to average radius of the spacer ring.

According to an embodiment of the invention, the elastic element is arranged in an annular recess formed in an axial surface of the compressor block.

According to an embodiment of the invention, an axial clearance is provided between the second surface of the first axial bearing plate and the axial surface of the compressor block.

According to an embodiment of the invention, the axial clearance between the second surface of the first axial bearing plate and the axial surface of the compressor block is in the range of 20 μm.

According to an embodiment of the invention, the bearing sleeve is configured to rotatably support the drive shaft.

According to an embodiment of the invention, the bearing sleeve includes at least one radial bearing part, and for example at least one radial gas bearing part.

According to an embodiment of the invention, the bearing sleeve is configured to surround the drive shaft and to cooperate with the outer surface of the drive shaft.

According to an embodiment of the invention, the compressor block includes an annular shoulder against which bears the bearing sleeve, and for example the abutment surface of the bearing sleeve.

According to an embodiment of the invention, the axial bearing arrangement further includes a securing member secured to the compressor block and axially tightening the bearing sleeve against the compressor block, and for example against the annular shoulder of the compressor block.

According to an embodiment of the invention, the bearing sleeve includes an annular shoulder against which bears the securing member.

According to an embodiment of the invention, the bearing sleeve includes a portion clamped between the compressor block and the securing member.

According to an embodiment of the invention, the securing member is secured by screwing to the compressor block.

According to an embodiment of the invention, the elastic element and the bearing sleeve are coaxially arranged.

According to an embodiment of the invention, the axial bearing arrangement further includes a second axial bearing plate having an annular ring shape, the second axial bearing plate having a first surface axially facing the first axial bearing plate and a second surface opposite to the first surface of the second axial bearing plate, the spacer ring being clamped between the first surfaces of the first and second axial bearing plates at radial outer portions of the first and second axial bearing plates, the spacer ring defining an axial distance between the first and second axial bearing plates, the bearing sleeve abutting the second surface of the second axial bearing plate, the elastic element axially biasing the first and second axial bearing plates and the spacer ring with the predetermined force against the abutment surface of the bearing sleeve.

According to an embodiment of the invention, the first and second axial bearing plates are parallel to each other.

According to an embodiment of the invention, the second axial bearing plate is formed as an integral part of the bearing sleeve.

The present invention also relates to a centrifugal compressor including a drive shaft and an axial bearing arrangement according to the invention.

According to an embodiment of the invention, the drive shaft includes a radial flange portion extending into a space between radial inner portions of the first surfaces of the first and second axial bearing plates.

According to an embodiment of the invention, the spacer ring surrounds the radial flange portion of the drive shaft.

According to an embodiment of the invention, an axial clearance is provided between the radial flange portion of the drive shaft and the first surfaces of the first and second axial bearing plates.

According to an embodiment of the invention, the axial clearance between the radial flange portion of the drive shaft and the first surfaces of the first and second axial bearing plates is in the range of 10 μm.

According to an embodiment of the invention, the centrifugal compressor is configured to introduce gas fluid between the radial flange portion of the drive shaft and the first surfaces of the first and second axial bearing plates to form an axial gas bearing for the drive shaft.

These and other advantages will become apparent upon reading the following description in view of the drawing attached hereto representing, as non-limiting examples, embodiments of a centrifugal compressor including an axial bearing arrangement according to the invention.

BRIEF DESCRIPTION OF THE DRAWINGS

The following detailed description of two embodiments of the invention is better understood when read in conjunction with the appended drawings being understood, however, that the invention is not limited to the specific embodiments disclosed.

DETAILED DESCRIPTION

Figure 1:
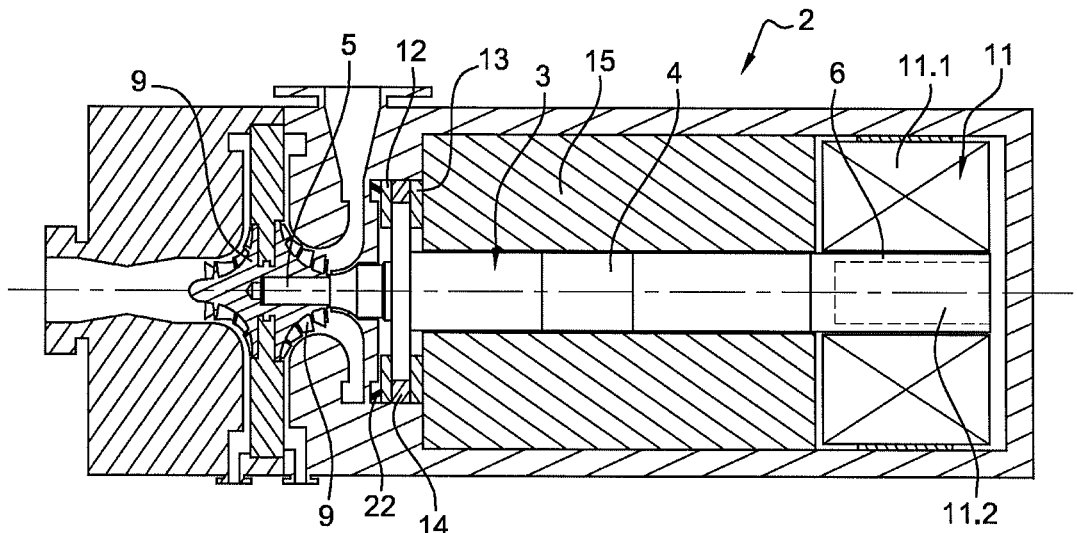
FIG. 1 is a schematic longitudinal section view of a centrifugal compressor including an axial bearing arrangement according to a first embodiment of the invention.
Figure 2:
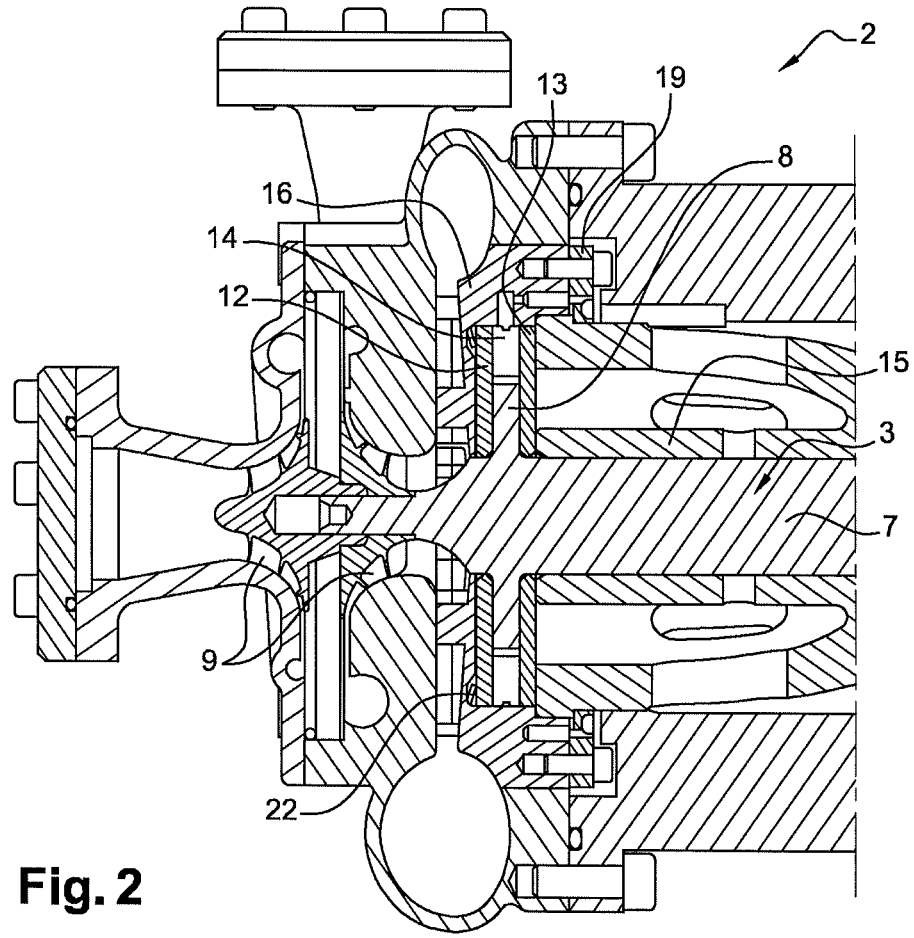
FIG. 2 is a partial longitudinal section view of the centrifugal compressor of FIG. 1.
Figure 3:
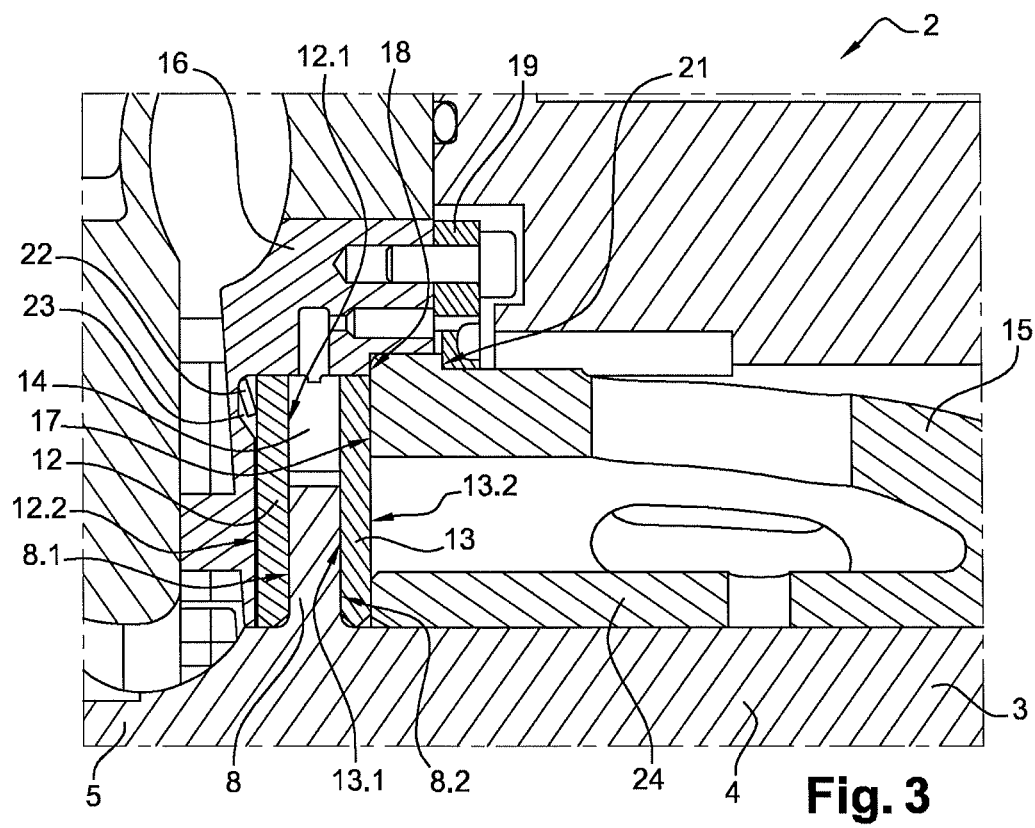
FIG. 3 is an enlarged view of a detail of FIG. 2.
Figure 4:
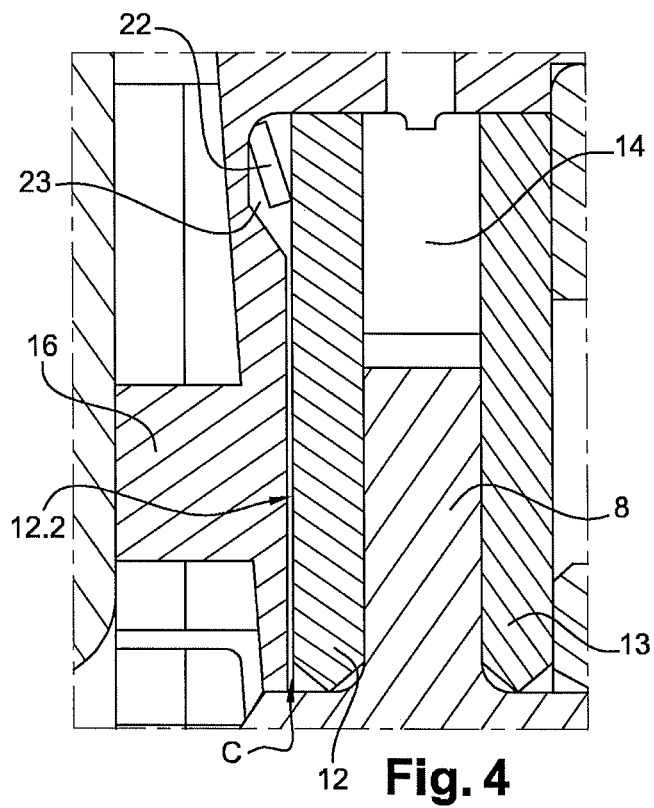
FIG. 4 is an enlarged view of a detail of FIG. 3.
Figure 5:
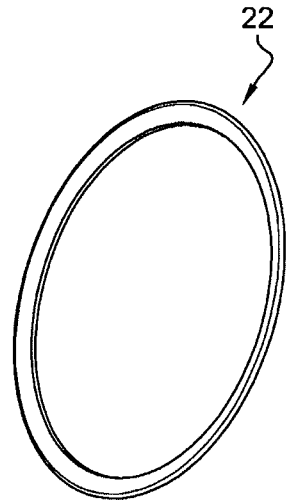
FIG. 5 is a perspective view of an elastic element of the axial bearing arrangement of FIG. 1.

FIG. 1 represents a centrifugal compressor 2 which may be for example a two-stage centrifugal compressor. The centrifugal compressor 2 includes a drive shaft 3 extending along a longitudinal axis A.

According to the embodiment shown on the figures, the drive shaft 3 includes an intermediate bearing part 4, an impeller part 5 arranged at a first axial end portion of the intermediate bearing part 4, and a drive part 6 arranged at a second axial end portion of the intermediate bearing part 4. Particularly, the intermediate bearing part 4 includes a cylindrical bearing portion 7 and a radial flange portion 8 extending radially outwardly from the cylindrical bearing portion 7. The radial flange portion 8 has a flat disc shape, and includes a first axial end face 8.1 and a second axial end face 8.2 opposite to the first axial end face 8.1.

The drive shaft 3 may be made for example of high strength steel, ceramic materials, or combinations thereof.

The centrifugal compressor 2 further includes at least one impeller 9 connected to the impeller part 5 of the drive shaft 3, and configured to compress a refrigerant. The centrifugal compressor 2 may for example include two impellers 9 arranged in a back-to-back configuration.

The centrifugal compressor 2 also includes an electrical motor 11 configured to drive in rotation the drive shaft 3 about the longitudinal axis A. The electrical motor 11 is advantageously arranged in a low pressure chamber, and includes a stator 11.1 and a rotor 11.2. According to an embodiment of the invention, the rotor 11.2 is connected to the drive part 6 of the drive shaft 3. To this end, the drive part 6 may include an axial bore within which is arranged the rotor 11.2. The rotor 11.2 may for example be firmly fitted, such as press-fitted or shrink fitted, within the axial bore.

The centrifugal compressor 2 further includes an axial bearing arrangement, also named thrust bearing arrangement, arranged in the low pressure chamber and configured to limit an axial movement of the drive shaft 3 during operation. The axial bearing arrangement may be a fluid axial bearing arrangement, and for example a gas axial bearing arrangement.

According to the embodiment shown on the figures, the axial bearing arrangement includes a first axial bearing plate 12 and a second axial bearing plate 13 each having an annular ring shape, and being arranged in parallel. The first axial bearing plate 12 has a first surface 12.1 axially facing the second axial bearing plate 13 and a second surface 12.2 opposite to the first surface 12.1, while the second axial bearing plate 13 has a first surface 13.1 axially facing the first axial bearing plate 12 and a second surface 13.2 opposite to the first surface 13.1.

The radial inner portions of the first surfaces 12.1, 13.1 of the first and second axial bearing plates 12, 13 define a space in which extends the radial flange portion 8 of the drive shaft 3. Particularly, the first surfaces 12.1, 13.1 of the first and second axial bearing plates 12, 13 are respectively configured to cooperate with the first and second axial end faces 8.1, 8.2 of the radial flange portion 8.

According to an embodiment of the invention, an axial clearance is provided between the radial flange portion 8 of the drive shaft 3 and the first surfaces 12.1, 13.1 of the first and second axial bearing plates 12, 13. Such an axial clearance is advantageously in the range of 10 µm.

The axial bearing arrangement further includes a spacer ring 14 surrounding the radial flange portion 8 of the drive shaft 3, and being clamped between the first surfaces 12.1, 13.1 of the first and second axial bearing plates 12, 13 at radial outer portions of the first and second axial bearing plates 12, 13. The spacer ring 14 defines an axial distance between the first and second axial bearing plates 12, 13, the axial distance being slightly greater than the width of the radial flange portion 8.

The axial bearing arrangement also includes a bearing sleeve 15 surrounding the drive shaft, and being secured to a compressor block 16 of the centrifugal compressor 2. Advantageously, the bearing sleeve 15 extends along the intermediate bearing part 4 of the drive shaft.

The bearing sleeve 15 includes an abutment surface 17 abutting the second surface 13.2 of the second axial bearing plate 13. The abutment surface 17 is located at an axial end of the bearing sleeve 15, and extends transversally, and advantageously perpendicularly, to the longitudinal axis A of the drive shaft 3.

According to the embodiment shown on the figures, the compressor block 16 includes an annular shoulder 18 against which bears the bearing sleeve 15, and more precisely the abutment surface 17 of the bearing sleeve 15.

In addition, the axial bearing arrangement includes a securing member 19 secured, for example by screwing, to the compressor block 16 and axially tightening the bearing sleeve 15 against the compressor block 16, and more particularly against the annular shoulder 18 of the compressor block 16.

According to the embodiment shown on the figures, the bearing sleeve 15 includes an annular shoulder 21 against which bears the securing member 19, and the bearing sleeve 15 is partially clamped between the compressor block 16 and the securing member 19.

The axial bearing arrangement further includes an elastic element 22 arranged between the second surface 12.2 of the first axial bearing plate 12 and the compressor block 16. The elastic element 22 axially biases the first and second axial bearing plates 12, 13 and the spacer ring 14 with a predetermined force, for example in the range of 1000 to 2000 N, and preferably about 1500 N, against the abutment surface 17 of the bearing sleeve 15. Advantageously, the elastic element 22 is an annular spring washer, preferably of the Belleville type, coaxially arranged with the bearing sleeve 15 and the drive shaft 3.

The elastic element 22 is advantageously arranged in an annular recess 23 formed in an axial surface of the compressor block 16, and is in contact with a radial outer portion of the second surface 12.2 of the first axial bearing plate 12, at a radius close to average radius of the spacer ring 14.

The elastic element allows, notably when a thermal expansion occurs in the centrifugal compressor, an axial sliding of the first and second axial bearing plates 12, 13 and of the spacer ring 14 with respect to the compressor block 16, and thus avoids deformations of the parts which could lead to a shortened lifetime of the centrifugal compressor.

According to an embodiment of the invention, an axial clearance C is provided between the second surface 12.2 of the first axial bearing plate 12 and the axial surface of the compressor block 16 provided with the annular recess 23. The axial clearance C is advantageously in the range of 20 µm.

According to an embodiment of the invention, an axial clearance C is provided between the second surface 12.2 of the first axial bearing plate 12 and the axial surface of the compressor block 16 provided with the annular recess 23. Said axial clearance C is advantageously in the range of 20 µm.

According to the embodiment shown on the figures, the bearing sleeve 15 is configured to rotatably support the drive shaft 3. Particularly the bearing sleeve 15 includes a radial bearing part 24 having an inner surface configured to cooperate with the outer surface of the cylindrical bearing portion 7 of the drive shaft 3. Therefore, the bearing sleeve 15 forms a radial sleeve bearing, and for example a gas radial sleeve bearing.

According to an embodiment of the invention, the centrifugal compressor 2 is configured so that gas fluid is introduced between the radial flange portion 8 of the drive shaft 3 and the first surfaces 12.1, 13.1 of the first and second axial bearing plates 12, 13 to form an axial gas bearing for the drive shaft 3. The centrifugal compressor 2 is also configured so that gas fluid is introduced between the cylindrical bearing portion 7 of the drive shaft 3 and the inner surface of the radial bearing part 24 to form a radial gas bearing for the drive shaft 3.

Figure 6:
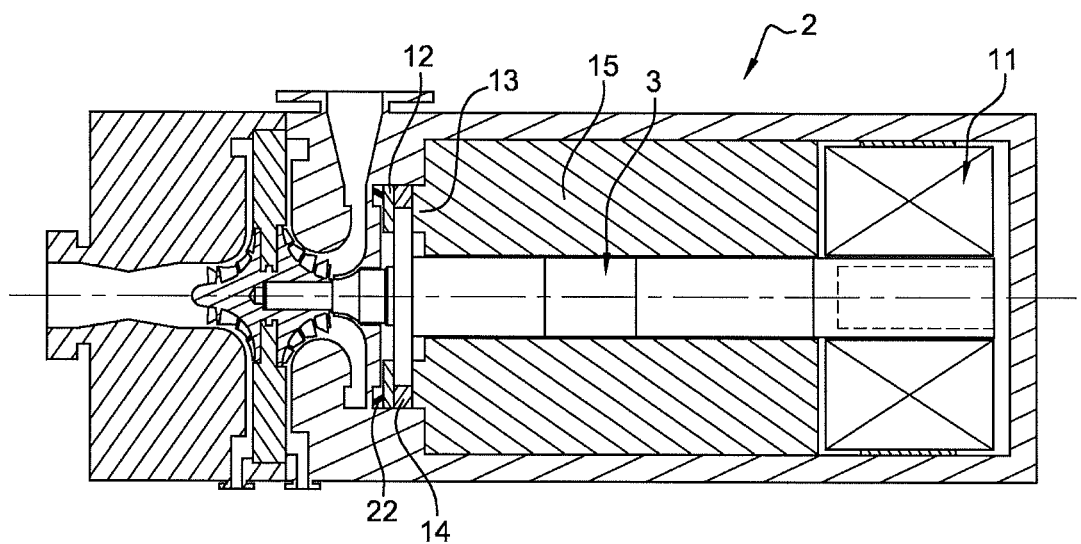
FIG. 6 is a schematic longitudinal section view of a centrifugal compressor including an axial bearing arrangement according to a second embodiment of the invention.

According to another embodiment of the invention shown on FIG. 6, the second axial bearing plate 13 may be formed as an integral part of the bearing sleeve 15.

Of course, the invention is not restricted to the embodiments described above by way of non-limiting examples, but on the contrary it encompasses all embodiments thereof.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. Axial bearing arrangement for a drive shaft of a centrifugal compressor, the axial bearing arrangement comprising:
   a first axial bearing plate having an annular ring shape, the first axial bearing plate having a first surface and a second surface opposite to the first surface of the first axial bearing plate, a spacer ring abutting the first surface of the first axial bearing plate at a radial outer portion of the first axial bearing plate, a bearing sleeve being secured to a compressor block, wherein the axial bearing arrangement further includes an elastic element arranged between the second surface of the first axial bearing plate and the compressor block, and in that the elastic element axially biases the first axial bearing plate and the spacer ring with a predetermined force against an abutment surface of the bearing sleeve.

2. The axial bearing arrangement according to claim 1, wherein the elastic element is an annular spring washer.

3. The axial bearing arrangement according to claim 2, wherein the predetermined force exerted by the elastic element on the first axial bearing plate is in the range of 1000 to 2000 N.

4. The axial bearing arrangement according claim 2, wherein the elastic element is in contact with a radial outer portion of the second surface of the first axial bearing plate.

5. The axial bearing arrangement according to claim 2, wherein the elastic element is arranged in an annular recess formed in an axial surface of the compressor block.

6. The axial bearing arrangement according to claim 1, wherein the predetermined force exerted by the elastic element on the first axial bearing plate is in the range of 1000 to 2000 N.

7. The axial bearing arrangement according claim 6, wherein the elastic element is in contact with a radial outer portion of the second surface of the first axial bearing plate.

8. The axial bearing arrangement according to claim 6, wherein the elastic element is arranged in an annular recess formed in an axial surface of the compressor block.

9. The axial bearing arrangement according to claim 1, wherein the elastic element is in contact with a radial outer portion of the second surface of the first axial bearing plate.

10. The axial bearing arrangement according to claim 9, wherein the elastic element is in contact with a radial outer portion of the second surface of the first axial bearing plate, at a radius close to average radius of the spacer ring.

11. The axial bearing arrangement according to claim 1, wherein the elastic element is arranged in an annular recess formed in an axial surface of the compressor block.

12. The axial bearing arrangement according to claim 11, wherein an axial clearance is provided between the second surface of the first axial bearing plate and the axial surface of the compressor block.

13. The axial bearing arrangement according to claim 1, wherein the bearing sleeve is configured to rotatably support the drive shaft.

14. The axial bearing arrangement according to claim 1, further including a securing member secured to the compressor block and axially tightening the bearing sleeve against the compressor block.

15. The axial bearing arrangement according to claim 1, further including a second axial bearing plate having an annular ring shape, the second axial bearing plate having a first surface axially facing the first axial bearing plate and a second surface opposite to the first surface of the second axial bearing plate, the spacer ring being clamped between the first surfaces of the first and second axial bearing plates at radial outer portions of the first and second axial bearing plates, the spacer ring defining an axial distance between the first and second axial bearing plates, the bearing sleeve abutting the second surface of the second axial bearing plate, the elastic element axially biasing the first and second axial bearing plates and the spacer ring with the predetermined force against the abutment surface of the bearing sleeve.

16. The axial bearing arrangement according to claim 15, wherein the second axial bearing plate is formed as an integral part of the bearing sleeve.

17. A centrifugal compressor including a drive shaft and an axial bearing arrangement according to claim 1.

18. The centrifugal compressor according to claim 17, wherein the drive shaft includes a radial flange portion extending into a space between radial inner portions of the first surfaces of the first and second axial bearing plates.

19. The centrifugal compressor according to claim 18, wherein an axial clearance is provided between the radial flange portion of the drive shaft and the first surfaces of the first and second axial bearing plates.

20. The centrifugal compressor according to claim 18, wherein the centrifugal compressor is configured to introduce gas fluid between the radial flange portion of the drive shaft and the first surfaces of the first and second axial bearing plates to form an axial gas bearing for the drive shaft.

* * * * *